United States Patent
Guo et al.

(10) Patent No.: US 9,565,428 B2
(45) Date of Patent: Feb. 7, 2017

(54) METHOD AND APPARATUS OF CHROMA INTRA PREDICTION WITH REDUCED LINE MEMORY

(75) Inventors: Mei Guo, San Jose, CA (US); Xun Guo, Beijing (CN); Yu-Wen Huang, Taipei (TW); Shaw-Min Lei, Hsinchu (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 14/123,094

(22) PCT Filed: Jun. 15, 2012

(86) PCT No.: PCT/CN2012/077007
§ 371 (c)(1),
(2), (4) Date: Nov. 28, 2013

(87) PCT Pub. No.: WO2012/175003
PCT Pub. Date: Dec. 27, 2012

(65) Prior Publication Data
US 2014/0086502 A1    Mar. 27, 2014

Related U.S. Application Data
(60) Provisional application No. 61/498,969, filed on Jun. 20, 2011.

(51) Int. Cl.
*G06K 9/36* (2006.01)
*G06K 9/46* (2006.01)
(Continued)

(52) U.S. Cl.
CPC ...... *H04N 19/00024* (2013.01); *H04N 19/105* (2014.11); *H04N 19/136* (2014.11);
(Continued)

(58) Field of Classification Search
None
See application file for complete search history.

(56) References Cited

U.S. PATENT DOCUMENTS 7,492,950 B2    2/2009  Suzuki et al.
7,787,048 B1 *  8/2010  Vojkovich et al. ........... 348/452
(Continued)

FOREIGN PATENT DOCUMENTS

CN           1701616 A      11/2005
CN         101222646 A       7/2008
(Continued)

OTHER PUBLICATIONS

Chen et al., "Chroma Intra Prediction by Reconstructed Luma Samples," JCTVC-C206, Oct. 7-15, 2010, pp. 1-7, Joint Collaborative Team on Video Coding (JCT-VC) of ITU-T SG 16 WP3 and ISO/IEC JTC1/SC29/WG11, Guangzhou, China.*
(Continued)

*Primary Examiner* — Feng Niu
(74) *Attorney, Agent, or Firm* — McClure, Qualey & Rodack, LLP

(57) ABSTRACT

A method and apparatus for chroma intra prediction for a current chroma block with reduced line memory requirement are disclosed. The chroma intra predictor is derived from reconstructed luma pixels of a current luma block using a model with parameters. In various embodiments according to the present invention, the derivation of the parameters relies on a reconstructed luma pixel set corresponding to neighboring reconstructed luma pixels from causal luma neighboring areas of the current luma block, wherein said causal luma neighboring areas include a first area corresponding to reconstructed luma pixels above a horizontal luma block boundary on a top side of the current luma block, and wherein the reconstructed luma pixels from the first area that are included in the reconstructed luma pixel
(Continued)

set are from a luma pixel line immediately above the horizontal luma block boundary.

16 Claims, 3 Drawing Sheets

(51) Int. Cl.
| | |
|---|---|
| *H04N 19/105* | (2014.01) |
| *H04N 19/96* | (2014.01) |
| *H04N 19/593* | (2014.01) |
| *H04N 19/136* | (2014.01) |
| *H04N 19/186* | (2014.01) |
| *H04N 19/182* | (2014.01) |
| *H04N 19/433* | (2014.01) |

(52) U.S. Cl.
  CPC ......... *H04N 19/182* (2014.11); *H04N 19/186* (2014.11); *H04N 19/433* (2014.11); *H04N 19/593* (2014.11); *H04N 19/96* (2014.11)

(56) References Cited

U.S. PATENT DOCUMENTS

| | | |
|---|---|---|
| 2006/0227876 A1 | 10/2006 | Sherigar et al. |
| 2010/0091860 A1 | 4/2010 | Anisimov |
| 2010/0157073 A1* | 6/2010 | Kondo et al. ............. 348/208.4 |
| 2012/0328013 A1* | 12/2012 | Budagavi et al. ....... 375/240.12 |
| 2013/0322523 A1* | 12/2013 | Huang et al. ............ 375/240.02 |
| 2014/0355667 A1* | 12/2014 | Lei et al. ................ 375/240.02 |

FOREIGN PATENT DOCUMENTS

| | | |
|---|---|---|
| CN | 101227624 A | 7/2008 |
| CN | 101379511 A | 3/2009 |
| JP | 2000023190 A | 1/2000 |

OTHER PUBLICATIONS

U.S. Appl. No. 61/498,265, filed Jun. 2011, Huang et al.*
Chen, Jianle et al. Chroma Intra Predicion by Reconstructed Luma Samples. Joint Collaborative Team on Video Coding (JCT-VC) of ITU-T SG16 WP3 and ISO/IEC JTCI/SC29/WG11 4th Meeting: Daegu, KR, Jan. 20-28, 2011, pp. 1-7, JCTVC-D350.

* cited by examiner

METHOD AND APPARATUS OF CHROMA INTRA PREDICTION WITH REDUCED LINE MEMORY

CROSS REFERENCE TO RELATED APPLICATIONS

The present invention claims priority to U.S. Provisional Patent Application Ser. No. 61/498,969, filed Jun. 20, 2011, entitled "Reducing Line Buffer for Intra Coding of Chroma with Reconstructed Luma Pixels". The U.S. Provisional Patent Application is hereby incorporated by reference in its entirety.

TECHNICAL FIELD

The present invention relates to video coding. In particular, the present invention relates to coding techniques associated with chroma intra prediction based on reconstructed luma pixels with reduced line memory requirement.

BACKGROUND

Motion compensated inter-frame coding has been widely adopted in various coding standards, such as MPEG-1/2/4 and H.261/H.263/H.264/AVC. While motion-compensated inter-frame coding can effectively reduce bitrate for compressed video, intra coding is required to compress the regions with high motions or scene changes. Besides, intra coding is also used to process an initial picture or to periodically insert I-pictures or I-blocks for random access or for alleviation of error propagation. Intra prediction exploits the spatial correlation within a picture or within a picture region. In practice, a picture or a picture region is divided into blocks and the intra prediction is performed on a block basis. Intra prediction for a current block can be relied upon pixels in neighboring blocks that have been processed. For example, if blocks in a picture or picture region are processed row by row from top to bottom and from left to right, neighboring blocks on the top and neighboring blocks on the left of the current block can be used to form intra predictor for pixels in the current block. While any pixels in the processed neighboring blocks can be used for intra predictor of pixels in the current block, very often only pixels of the neighboring blocks that are adjacent to the current block boundaries on the top and on the left are used.

The intra predictor is usually designed to exploit spatial features in the picture such as smooth area (DC mode), vertical line or edge, horizontal line or edge and diagonal line or edge. Furthermore, a spatial correlation often exists in both luminance (luma) and chrominance (chroma) components. Therefore, the intra luma prediction mode can be used as a candidate for the intra chroma prediction mode. In recent development in High Efficiency Video Coding (HEVC), considering the correlation between luma and chroma components, a chroma intra prediction method has been proposed by Chen et al., in "CE6.a: Chroma intra prediction by reconstructed luma samples", Joint Collaborative Team on Video Coding (JCT-VC) of ITU-T SG16 WP3 and ISO/IEC JTC1/SC29/WG11, 4th Meeting: Daegu, KR, 20-28 Jan. 2011, Document: JCTVC-D350. According to Chen et al., reconstructed luma blocks can be used as predictors for co-located chroma blocks. The type of chroma intra prediction is termed as LM prediction.

According to the LM prediction, the chroma values are predicted from reconstructed luma values of the same block according to the following model:

$$\text{Pred}_C[x,y] = \alpha \cdot \text{Rec}_L'[x,y] + \beta, \text{ for } x=0, \ldots (N-1), \text{ and } y=0, \ldots (N-1), \quad (1)$$

where $\text{Pred}_C[x,y]$ indicates the predictor for a chroma sample at [x,y] of a chroma block, $\text{Rec}_L'[x,y]$ indicates the luma sample at [x,y] of the corresponding luma block, and N denotes the horizontal resolution (i.e., the vertical resolution) of the chroma block to be predicted. Parameters $\alpha$ and $\beta$ are derived from causal reconstructed samples around the current block. Since the luma component usually has higher resolution than the chroma components, the reconstructed luma component has to be decimated to match the resolution of the chroma components. For example, for 4:2:0 sampling format, the U and V components may have half of the number of pixels in the vertical and the horizontal directions as the luma component. Therefore, 2:1 resolution reduction in the vertical and the horizontal directions has to be applied to the reconstructed luma sample $\text{Rec}_L[x,y]$ to derive $\text{Rec}_L'[x,y]$. The resolution reduction can be achieved by downsampling process or subsampling process.

The downsampling process refers to signal decimation by applying proper low-pass filtering before downsampling (also called subsampling in the art) to reduce or avoid possible signal aliasing. On the other hand, subsampling process performs direct downsampling without prior filtering. Both the downsampling process and the subsampling process are called decimation process in this disclosure. While the subsampling processing may cause signal aliasing, the subsampling processing is used in some signal processing systems due to its simplicity. For chroma intra prediction using the LM mode, Chen et al. apply the sub-sampling process in the horizontal direction and the down-sampling process in the vertical direction, where the vertical down-sampling process is performed as follows:

$$\text{Rec}_L'[x,y] = (\text{Rec}_L[2x,2y] + \text{Rec}_L[2x,2y+1]) \gg 1, \text{ for } x=-1,\ldots,(N-1) \text{ and } y=-1,\ldots,(N-1), \quad (2)$$

where N denotes the horizontal resolution (i.e., the vertical resolution) of the chroma block to be predicted and the resolution-reduced (i.e., decimated) luma block.

Parameters $\alpha$ and $\beta$ are derived based on causal reconstructed chroma pixels around a current chroma block and causal reconstructed luma pixels around a current luma block as shown in FIG. 1A and FIG. 1B. The causal reconstructed chroma pixels on the top 112 and on the left 114 of the current chroma block 110, and the decimated reconstructed luma samples on the top 130 and on the left 140 of the current luma block 120 as shown in FIG. 1A and FIG. 1B respectively. These causal neighboring pixels shown as dark dots in FIG. 1A and FIG. 1B are used to derive parameters $\alpha$ and $\beta$ as follows:

$$\alpha = \frac{I \cdot \sum_{i=0}^{I-1} \text{Rec}_c(i) \cdot \text{Rec}_L'(i) - \sum_{i=0}^{I-1} \text{Rec}_c(i) \cdot \sum_{i=0}^{I-1} \text{Rec}_L'(i)}{I \cdot \sum_{i=0}^{I-1} \text{Rec}_L'(i) \cdot \text{Rec}_L'(i) - \left(\sum_{i=0}^{I-1} \text{Rec}_L'(i)\right)^2} = \frac{A_1}{A_2}, \quad (3)$$

and $$\beta = \frac{\sum_{i=0}^{I-1} \text{Rec}_c(i) - \alpha \cdot \sum_{i=0}^{I-1} \text{Rec}_L'(i)}{I}, \quad (4)$$

where $\text{Rec}_C(i)$ and $\text{Rec}_L'(i)$ indicate reconstructed chroma samples and decimated luma samples around the chroma block 110 and the luma block 120 respectively, and I indicates total number of neighboring data. For the example shown in FIG. 1A and FIG. 1B, where the chroma block size is N×N and the luma block size is 2N×2N, total involved samples number I is 2N. When left or above causal samples are unavailable, padding samples are used instead.

The computation of each $Rec_L'[x,y]$ sample requires two reconstructed luma samples as shown in equation (2). In hardware implementation, when the luma block 120 is just below the largest coding unit (LCU), two line buffers for storing the reconstructed luma lines 132 and 134 above the current block 120 are required in order to derive parameters $\alpha$ and $\beta$ for chroma intra prediction. The size of line buffers for storing the reconstructed luma lines 132 and 134 is proportional to the picture width. For large pictures, the size of line buffers for deriving parameters $\alpha$ and $\beta$ may be substantial. The requirement of large size line buffer will lead to increased system hardware cost, particularly for on-chip line buffer implementation, such as Static Random Access Memory (SRAM). Accordingly, it is desirable to develop chroma intra prediction methods and apparatuses that use reduced line buffers. The reconstructed luma samples on the left side of the current block usually are not an issue for deriving parameters $\alpha$ and $\beta$ due to the small size memory requirement, i.e. on-chip column buffer, corresponding to these samples. After a current block is intra-coded, there is no need of the reconstructed luma samples on the left of the current block for deriving parameters $\alpha$ and $\beta$ for subsequently blocks.

SUMMARY

A method and apparatus for chroma intra prediction for a current chroma block are disclosed. The chroma intra predictor is derived from reconstructed luma pixels of a current luma block using a model with parameters. In one embodiment according to the present invention, the method for chroma intra prediction comprises receiving a reconstructed luma pixel set corresponding to neighboring reconstructed luma pixels from causal luma neighboring areas of the current luma block, wherein said causal luma neighboring areas include a first area corresponding to reconstructed luma pixels above a horizontal luma block boundary on a top side of the current luma block, and wherein the reconstructed luma pixels from the first area that are included in the reconstructed luma pixel set are from a luma pixel line immediately above the horizontal luma block boundary. The horizontal luma block boundary could be a largest coding unit (LCU) boundary or a prediction unit (PU) boundary. A LCU boundary means the first area is located in the above LCU of the LCU comprising the current block. A PU boundary means the first area is located in the above PU of the current PU and those two PUs could be located in the same LCU or in different LCUs. The method further comprises receiving a reconstructed chroma pixel set corresponding to neighboring reconstructed chroma pixels from causal chroma neighboring areas of the current chroma block. According to the reconstructed luma pixel set and the reconstructed chroma pixel set, the parameters are derived. The derived parameters are then used to generate the chroma intra predictor for chroma pixels to be predicted in the current chroma block based on the reconstructed luma pixels of the current luma block using the model with parameters derived.

The reconstructed luma pixels in the first area are resolution-reduced horizontally to match horizontal resolution of the chroma pixels to be predicted in the current chroma block and the reconstructed luma pixels from the first area are R:1 resolution-reduced horizontally using either down-sampling process or subsampling process, and wherein R is the horizontal resolution ratio of the reconstructed luma pixels and the chroma pixels to be predicted. The causal luma neighboring areas further include a second area corresponding to the reconstructed luma pixels to the left of a vertical luma block boundary on a left side of the current luma block, wherein the reconstructed luma pixels from the second area that are included in the reconstructed luma pixel set are within R luma pixel columns to the left of the vertical luma block boundary, and wherein R is the horizontal resolution ratio of the reconstructed luma pixels and the chroma pixels to be predicted. The reconstructed luma pixels in the second area are N:1 resolution-reduced vertically using either the down-sampling process or the subsampling process, wherein N is the vertical resolution ratio of the reconstructed luma pixels and the chroma pixels to be predicted.

DETAILED DESCRIPTION

As described above, a conventional approach for chroma intra prediction using the LM mode requires two line buffers to store the reconstructed luma samples in order to derive parameter $\alpha$ and $\beta$. Parameter $\alpha$ and $\beta$ are then used to form chroma intra predictor based on corresponding reconstructed luma samples in a co-located luma block using a linear model with $\alpha$ and $\beta$ as parameters. The derivation of $\alpha$ and $\beta$ relies on two line buffers to store samples above the current block according to the conventional chroma intra prediction. On the other hand, embodiments according to the present invention reduces the buffer requirement down to one buffer line for deriving $\alpha$ and $\beta$.

Figure 2:
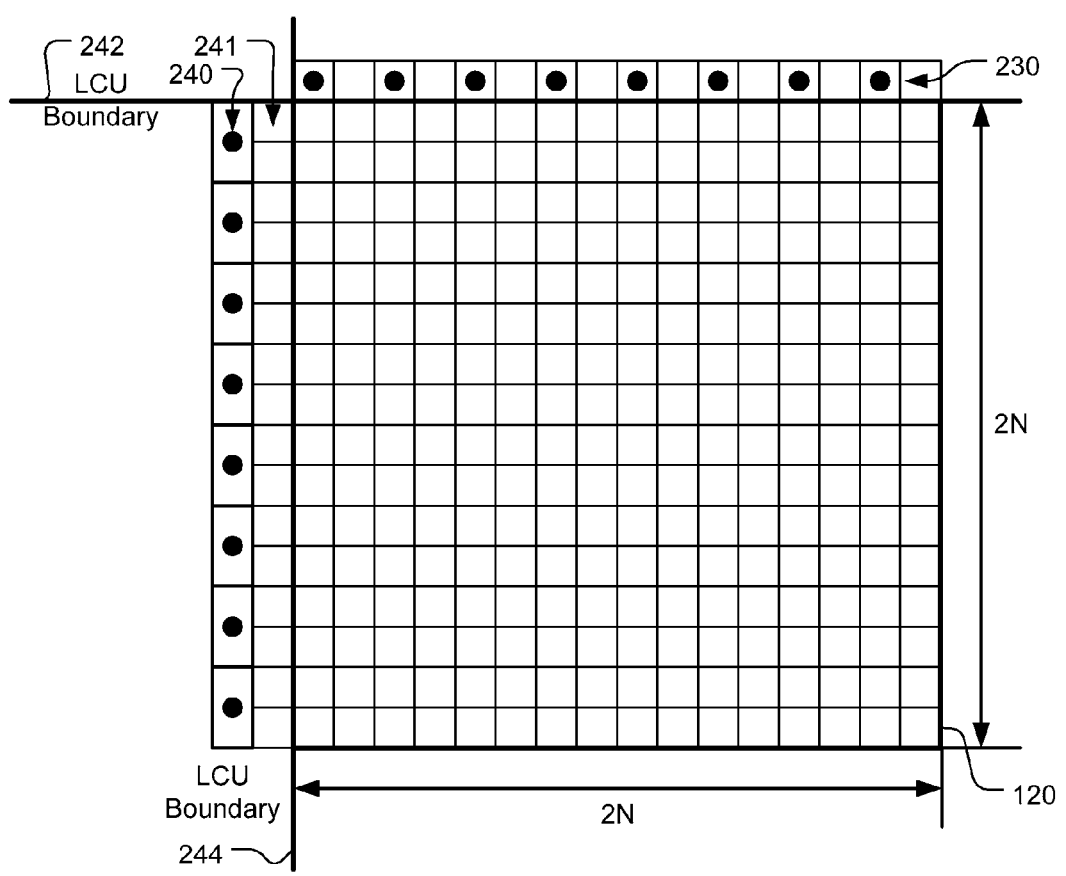
FIG. 2 illustrates an exemplary neighboring luma pixel configuration used for deriving parameters for chroma intra prediction based on reconstructed luma pixels according to an embodiment of the present invention, where the horizontal boundary on the top side of the current block corresponds to a Largest Coding Unit (LCU) boundary.

The derivation of $\alpha$ and $\beta$ relies on causal neighboring pixels around a current block. The causal neighboring areas may include an area corresponding to pixels above the horizontal boundary on the top side of the block. The causal neighboring areas may also include another area corresponding to pixels to the left of the vertical boundary on the left side of the block and below the horizontal boundary on the top side of the block. In one embodiment of the present invention, the derivation of parameters $\alpha$ and $\beta$ relies on only one reconstructed luma pixel line above the block boundary 242 on the top side of the block when the block boundary 242 corresponds to a Largest Coding Unit (LCU)

boundary as shown in FIG. 2. While parameters α and β are derived for a block, the chroma intra predictor may be performed on sub-blocks of the block. LCU and PU are various block structures used for processing pixel data according to the HEVC standard. The reconstructed decimated luma values $Rec_L'[x,y]$ according to the present invention are derived from the reconstructed luma pixel line 230 as shown in FIG. 2.

Since only one reconstructed luma pixel line 230 is used from the area above horizontal LCU boundary 242, there is no need for vertical sub-sampling process or down-sampling process. In the horizontal direction, resolution reduction is performed to produce decimated luma samples that match the resolution of chroma samples to be predicted. In the example shown in FIG. 2, 2:1 horizontal decimation is performed on pixel line 230. The resolution reduction can be based on the sub-sampling process or the down-sampling process. Horizontal sub-sampling process is illustrated in FIG. 2 as an example, where $$Rec_L'[x,y]=Rec_L[2x,2y+1], \text{ for } x=0,\ldots,(N-1) \text{ and } y=-1, \quad (5)$$

where N denotes the horizontal resolution (i.e., the vertical resolution) of the chroma block to be predicted and the resolution-reduced (i.e., decimated) luma block.

Figure 3:
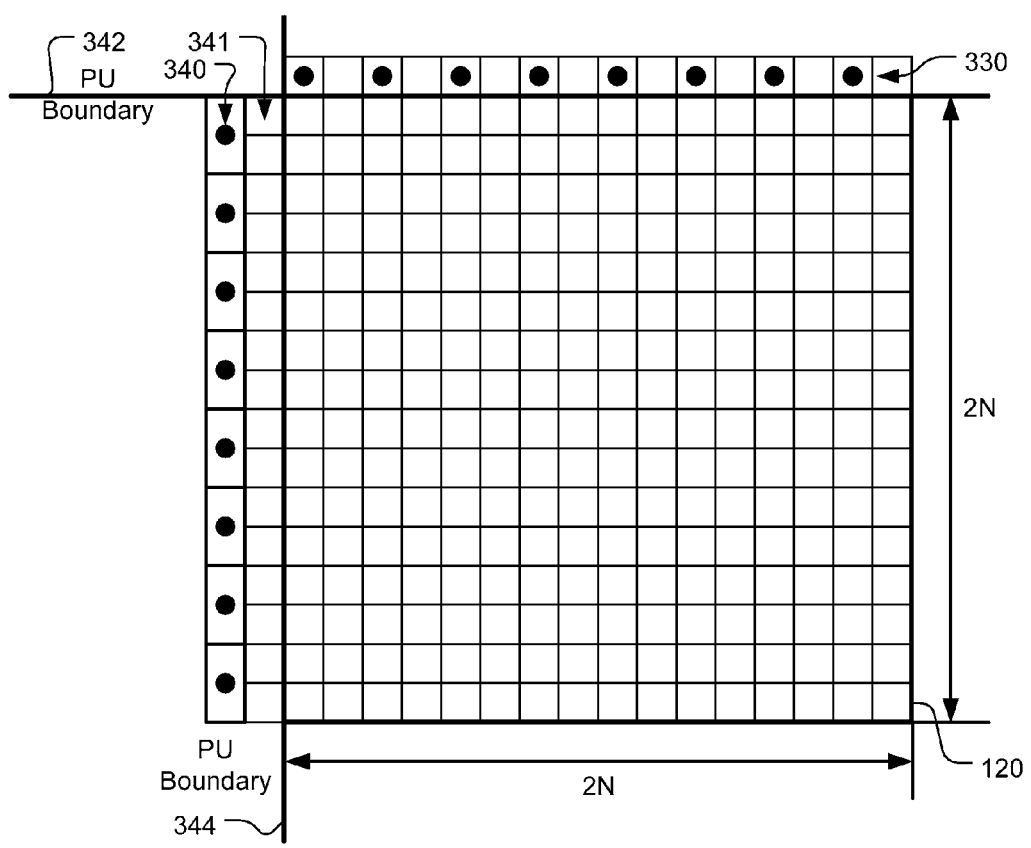
FIG. 3 illustrates an exemplary neighboring luma pixel configuration used for deriving parameters for chroma intra prediction based on reconstructed luma pixels according to an embodiment of the present invention, where the horizontal boundary on the top side of the current block corresponds to a Prediction Unit (PU) boundary.

In one embodiment of the present invention, the derivation of parameters α and β relies on only one reconstructed luma pixel line above the block boundary 342 on the top side of the block 120 when the block boundary 342 corresponds to a prediction unit (PU) boundary, as shown in FIG. 3. The pixel line 330 immediately above a horizontal PU boundary 342 instead of a horizontal LCU boundary is used to derive parameters α and β for generating chroma intra predictor for a block. Similar to the case of LCU boundary, there is no need for vertical sub-sampling process or down-sampling process. In the horizontal direction, resolution reduction is performed to produce decimated luma samples that match the resolution of chroma samples to be predicted. In the example shown in FIG. 3, 2:1 horizontal decimation is performed on pixel line 330. The resolution reduction can be based on the sub-sampling process or the down-sampling process. Horizontal sub-sampling process is used in FIG. 3 according to equation (5).

While the examples shown in FIG. 2 and FIG. 3 use horizontal subsampling process, embodiments according to the present invention may also use horizontal downsampling process to derive the decimated reconstructed luma samples for the pixel line above the horizontal LCU or PU boundary. For example, a low-pass filter with filter taps [¼, ½, ¼] may be used as follows:

$$Rec_L'[x,y]=(Rec_L[2x-1,2y+1]+2*Rec_L[2x,2y+1]+ Rec_L[2x+1,2y+1])>>2 \text{ for } x=0,\ldots,(N-1) \text{ and } y=-1. \quad (6)$$

The type of filter shown in equation (6) is also called Finite Impulse Response (FIR) Filter in the field of digital signal processing. While the low-pass filter with filter taps [¼, ½, ¼] is used as an example, other low-pass filters may also be used for horizontal downsampling.

Figure 1A:
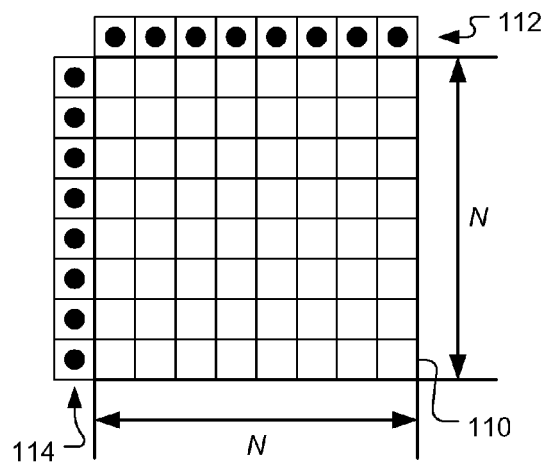
FIG. 1A illustrates an exemplary neighboring chroma pixel configuration used for deriving parameters for chroma intra prediction based on reconstructed luma pixels.
Figure 1B:
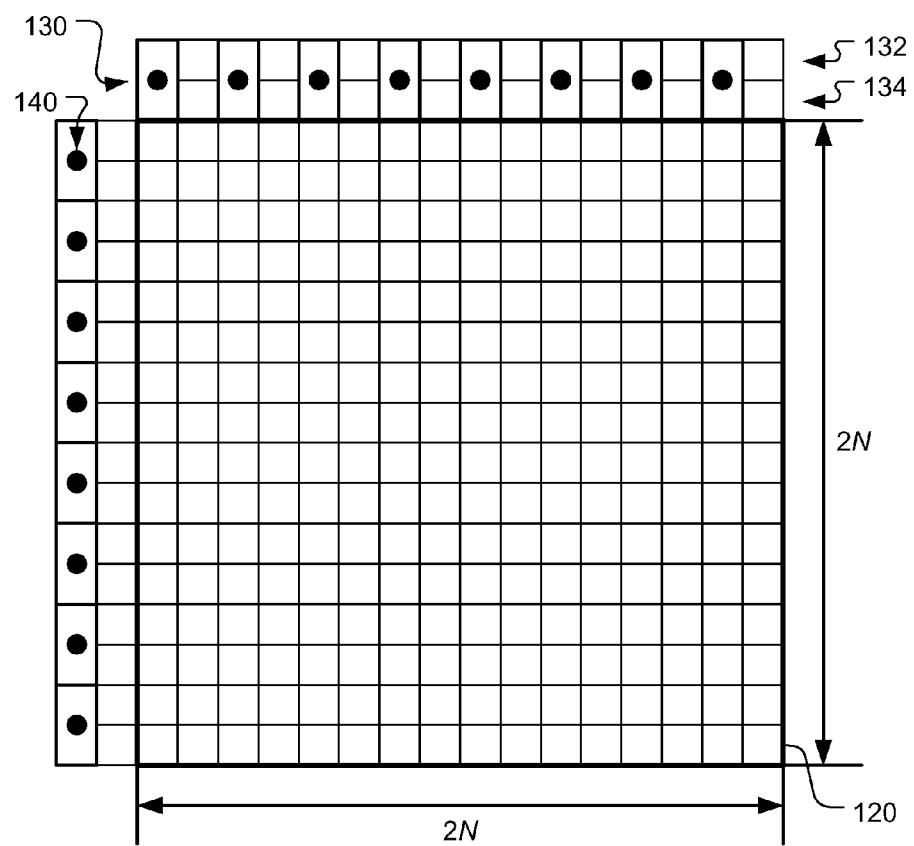
FIG. 1B illustrates an exemplary neighboring luma pixel configuration used for deriving parameters for chroma intra prediction based on reconstructed luma pixels according to a prior art.

In FIG. 1, a reconstructed luma pixel column 140 to the left side of the current block 120 is used to derive parameters α and β. Embodiments according to the present invention as shown in FIG. 2 and FIG. 3 may adopt similar decimation process as the conventional approach. Nevertheless, other decimation process may also be used. In FIG. 2, a reconstructed luma pixel column 240 to the left of the vertical LCU boundary 244 is used for deriving parameters α and β. Similarly, in FIG. 3, a reconstructed luma pixel column 340 to the left of the vertical PU boundary 344 is used for deriving parameters α and β. In FIG. 2 and FIG. 3, the sub-sampling process is used in the horizontal direction to achieve 2:1 decimation. However, the down-sampling process may also be used for horizontal decimation both pixel columns 240 and 241 or both pixel columns 340 and 341 may be used for deriving parameters α and β. On the other hand, while the down-sampling process is illustrated in FIG. 2 and FIG. 3 for decimation, the sub-sampling process may also be used for vertical decimation.

The above description is presented to enable a person of ordinary skill in the art to practice the present invention as provided in the context of a particular application and its requirements. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced Embodiment of video systems incorporating encoding or decoding of intra chroma prediction mode according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for chroma intra prediction for a current chroma block, wherein chroma intra predictor is derived from reconstructed luma pixels of a current luma block using a model with parameters, the method comprising:
   receiving a reconstructed luma pixel set corresponding to
      neighboring reconstructed luma pixels from causal luma neighboring areas of the current luma block, wherein said causal luma neighboring areas comprise a first area corresponding to reconstructed luma pixels above a horizontal luma block boundary on a top side of the current luma block, and wherein the reconstructed luma pixels from the first area that are included in the reconstructed luma pixel set are from a luma pixel line immediately above the horizontal luma block boundary;

receiving a reconstructed chroma pixel set corresponding to neighboring reconstructed chroma pixels from causal chroma neighboring areas of the current chroma block;

deriving the parameters based on said reconstructed luma pixel set and said reconstructed chroma pixel set; and generating the chroma intra predictor for chroma pixels to be predicted in the current chroma block based on the reconstructed luma pixels of the current luma block using the model with the parameters derived, wherein said reconstructed luma pixel set used to derive the parameters used for generating the chroma intra predictor includes only one reconstruction luma pixel line immediately above the horizontal luma block boundary, wherein the horizontal luma block boundary comprises a prediction unit boundary, and wherein derivation of the parameters utilizes only one line buffer to store said reconstructed luma pixel set.

2. The method of claim 1, wherein the reconstructed luma pixels in the first area are resolution-reduced horizontally to match a horizontal resolution of the chroma pixels to be predicted in the current chroma block, when the horizontal resolution of the current chroma block is different from that of the current luma block.

3. The method of claim 2, wherein the reconstructed luma pixels from the first area are N:1 resolution-reduced horizontally using either down-sampling process or subsampling process, and wherein N is resolution ratio of the reconstructed luma pixels and the chroma pixels to be predicted.

4. The method of claim 3, wherein a 3-tap FIR filter (Finite Impulse Response filter) is used for the down-sampling process.

5. The method of claim 4, wherein the 3-tap FIR filter uses coefficients corresponding to 1, 2, and 1.

6. The method of claim 1, wherein the causal luma neighboring areas further comprise a second area corresponding to reconstructed luma pixels to the left of a vertical luma block boundary on a left side of the current luma block, wherein the reconstructed luma pixels from the second area that are included in the reconstructed luma pixel set are within N luma pixel columns to the left of the vertical luma block boundary, and wherein N is a horizontal resolution ratio of the reconstructed luma pixels and the reconstructed chroma pixels.

7. The method of claim 6, wherein the reconstructed luma pixels in the second area are R:1 resolution-reduced horizontally using either down-sampling process or subsampling process.

8. The method of claim 6, wherein the reconstructed luma pixels in the second area are N:1 resolution-reduced vertically using either down-sampling process or subsampling process, wherein N is vertical resolution ratio of the reconstructed luma pixels and the chroma pixels to be predicted.

9. An apparatus for chroma intra prediction for a current chroma block, wherein chroma intra predictor is derived from reconstructed luma pixels of a current luma block using a model with parameters, the apparatus comprising at least one electronic circuit configured to:

receive a reconstructed luma pixel set corresponding to neighboring reconstructed luma pixels from causal luma neighboring areas of the current luma block, wherein said causal luma neighboring areas comprise a first area corresponding to reconstructed luma pixels above a horizontal luma block boundary on a top side of the current luma block, and wherein the reconstructed luma pixels from the first area that are included in the reconstructed luma pixel set are from a luma pixel line immediately above the horizontal luma block boundary;

receive a reconstructed chroma pixel set corresponding to neighboring reconstructed chroma pixels from causal chroma neighboring areas of the current chroma block;

derive the parameters based on said reconstructed luma pixel set and said reconstructed chroma pixel set; and generate the chroma intra predictor for chroma pixels to be predicted in the current chroma block based on the reconstructed luma pixels of the current luma block using the model with the parameters derived, wherein said reconstructed luma pixel set used to derive the parameters used for generating the chroma intra predictor includes only one reconstruction luma pixel line immediately above the horizontal luma block boundary, wherein the horizontal luma block boundary comprises a prediction unit boundary, and wherein derivation of the parameters utilizes only one line buffer to store said reconstructed luma pixel set.

10. The apparatus of claim 9, wherein the reconstructed luma pixels in the first area are resolution-reduced horizontally to match a horizontal resolution of the chroma pixels to be predicted in the current chroma block, when the horizontal resolutions of the current chroma block is different from that of the current luma block.

11. The apparatus of claim 10, wherein the reconstructed luma pixels from the first area are N:1 resolution-reduced horizontally using either down-sampling process or subsampling process, and wherein N is resolution ratio of the reconstructed luma pixels and the chroma pixels to be predicted.

12. The apparatus of claim 11, wherein a 3-tap FIR filter (Finite Impulse Response filter) is used for the down-sampling process.

13. The apparatus of claim 12, wherein the 3-tap FIR filter uses coefficients corresponding to 1, 2, and 1.

14. The apparatus of claim 9, wherein the causal luma neighboring areas further comprise a second area corresponding to the reconstructed luma pixels to the left of a vertical luma block boundary on a left side of the current luma block, wherein the reconstructed luma pixels from the second area that are included in the reconstructed luma pixel set are within N luma pixel columns to the left of the vertical luma block boundary, and wherein N is horizontal resolution ratio of the reconstructed luma pixels and the chroma pixels to be predicted.

15. The apparatus of claim 14, wherein the reconstructed luma pixels in the second area are R:1 resolution-reduced horizontally using either down-sampling process or sub sampling process.

16. The apparatus of claim 14, wherein the reconstructed luma pixels in the second area are N:1 resolution-reduced vertically using either down-sampling process or subsampling process, wherein N is vertical resolution ratio of the reconstructed luma pixels and the chroma pixels to be predicted.

* * * * *